Patented June 6, 1933

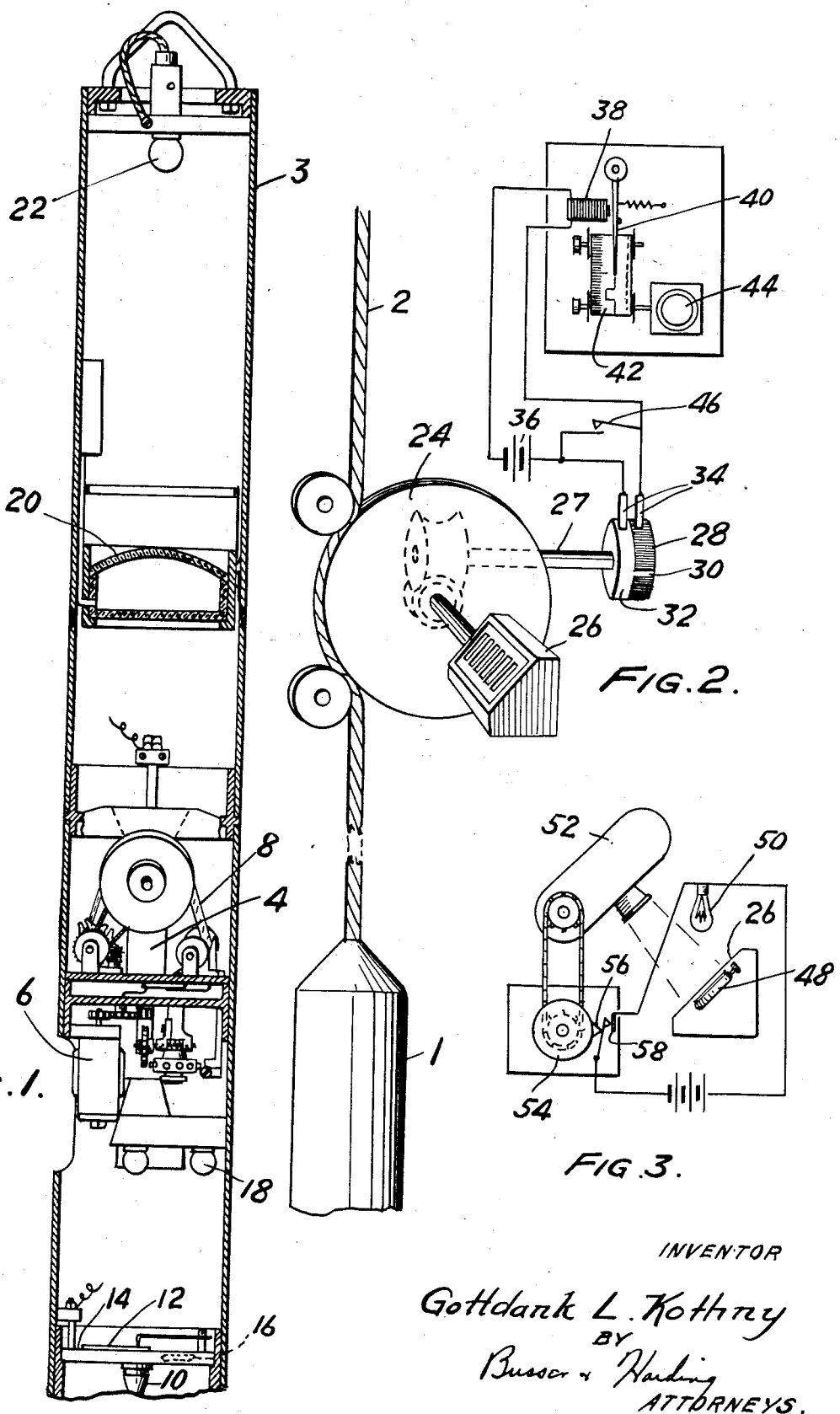
June 6, 1933. G. L. KOTHNY 1,912,485
WELL SURVEYING APPARATUS
Filed Sept. 3, 1930
INVENTOR
Gottdank L. Kothny
BY
Busser & Harding
ATTORNEYS.

1,912,485

UNITED STATES PATENT OFFICE

GOTTDANK L. KOTHNY, OF STRAFFORD, PENNSYLVANIA, ASSIGNOR TO SPERRY-SUN WELL SURVEYING COMPANY, OF PHILADELPHIA, PENNSYLVANIA, A CORPORATION OF DELAWARE

WELL SURVEYING APPARATUS

Application filed September 3, 1930. Serial No. 479,471.

This invention relates to well surveying apparatus and particularly to means whereby the depths at which various readings of orientation and slope are made may be readily determined.

Surface control of well surveying instruments or even the transmission of electrical energy for the surveying apparatus from the surface is impractical, since cables which would even give a semblance of satisfaction are very expensive and even these have a very short life by reason of the destructive action of friction and mud within the bore hole. Accordingly the practical operation of a well surveying device dictates the inclusion therein of a power supply which will operate an automatic type of recording mechanism. The absence of surface control makes it necessary to provide suitable means whereby there can be determined the depths at which certain portions of the records are made if the recording mechanism is adapted to make continuous or successive records during the lowering or raising of the device.

A practical means of accomplishing this is disclosed in the application of Williston and Nichols, Ser. No. 400,479, filed October 18, 1929, in which there is photographed simultaneously with the various recording instruments a chronometer in the form of a watch synchronized with a chronometer at the surface. If an observer at the surface records the times at which the instrument reaches various depths simple interpolation will give the depths at which the various records were made.

It is the broad object of the present invention to provide means in connection with a well surveying device for automatically recording the times at which the surveying instrument reaches certain depths so that errors of observation will not arise and the survey of a well may be carried out more rapidly, the instrument being lowered into the well and raised therefrom in a minimum of time.

Further objects of the invention particularly relating to details will be apparent from the following description read in conjunction with the accompanying drawing, in which:

Fig. 1 is a vertical section through a portion of a well surveying instrument;

Fig. 2 is a diagrammatic view illustrating one type of mechanism provided for correlating depth and time; and Fig. 3 is a second diagrammatic view of another system designed for the same purpose.

Referring first to Fig. 2 there is illustrated at 1 the outer protective casing of the surveying instrument adapted to be lowered into the bore hole on the lower end of the cable 2. The outer casing 1 contains, besides a power supply (not shown) surveying instruments which may be of the type illustrated in Fig. 1, which there is shown the recording instruments of the type disclosed in the said Williston and Nichols application. The inner recording instrument casing 3 contains a camera 4 adapted to photograph in opposite directions, a motor 6 being provided to drive the camera to intermittently feed the film 8 across a suitable aperture between the two sets of lenses. This motor 6 also drives a device for producing a flashing of lamps, later described.

Below the camera is located a gyroscope 10 partially illustrated in Fig. 1, the vertical gimbal ring of which carries a pointer 12 moving adjacent a scale 14. Also located adjacent the scale 14 and adapted to be photographed with the scale and pointer, is a chronometer 16 which may be in the form of a watch. The pointer, scale and watch are intermittently illuminated by lamps 18 controlled by the flashing device and arranged to light when the film 8 is stationary.

Above the camera is a box level 20 illuminated by a lamp 22 flashed simultaneously with the lamps 18.

As a result of this arrangement a series of exposures on the film are produced which contain a record of the position of the gyroscope, the bubble in the box level 20 and the time at which the record was made.

Referring now to Fig. 2, the cable 2 is shown as trained over a pulley 24 which is affixed to a shaft adapted to actuate a counter 26 which may be omitted, if desired, but which is useful for the purpose of ready check of the depth to which the recording instruments have descended. Through the medium of suitable reduction gearing the pulley 24 drives a drum provided with an insulating portion 28 extending almost completely therearound but being interrupted by an extension 30 of a conducting ring 32 forming the other portion of the cylindrical surface. Brushes 34 bear on the ring 32 and on the insulating portion 28 and on the conducting extension 30, respectively, so that normally a circuit including the battery 36 and electrical magnet 38 is interrupted except when the extension 30 is engaged by the corresponding brush.

The electromagnet 38 is arranged to attract an armature 40 which carries a suitable stylus or other marking device bearing upon a record member 42 which is driven by a clockwork mechanism 44. Preferably this record member, which is moved properly by suitable sprockets driven by the clockwork mechanism, is calibrated in terms of time. As a result, when the well surveying instrument is being lowered there will be produced a straight line on the record member until such time as the extension 30 passes under its brush. The circuit 38 will be thus momentarily closed, causing movement of the stylus 40 and producing a mark on the record member. Since each revolution of the shaft 27 produces a sidewise deviation from the generally continuous straight mark of the stylus, observation of the counter 26 and the records on member 42, or on the member alone if the counter is not used, indicate the times at which various depths are reached, the record being compared at the beginning and preferably at the end as a check with the time indicated by the chronometer 16. To facilitate comparison the stylus may be moved to give an indication at a definite time, as indicated by the chronometer, by momentary closure of the key 46 shunted across the brushes 34.

Instead of the arrangement illustrated in Fig. 2, that shown in Fig. 3 may be used, in which the counter 26, driven as in Fig. 2, is photographed simultaneously with a chronometer 48, synchronized with chronometer 16. In its preferred form the counter and chronometer are enclosed in a light-tight receptacle and a lamp 50 is provided to intermittently illuminate their faces, which are photographed simultaneously by a motion picture camera 52. This camera is driven from a clockwork mechanism 54 in the usual fashion, producing intermittent movement of the film through suitable Geneva mechanism or the equivalent. A projection 56 carried by a disc driven by the clockwork mechanism intermittently closes at 58 the circuit through the lamp 50 so that a series of exposures are produced from which the times at which various depths are reached may be readily determined.

Instead of the above arrangements, numerous others will be obvious to those skilled in the art. For example, the ordinary type of time stamping means may be used to stamp a record member moving in unison with the supporting cable 2. It will be obvious that by reason of the automatic recording of corresponding depths and times the operation of surveying a bore hole may be considerably speeded up and there is little likelihood of error due to faulty observation.

What I claim and desire to protect by Letters Patent is:

1. In combination with a well surveying instrument having means for simultaneously producing records indicating the inclinations of a bore hole at various depths and the times at which such records are made, means arranged to automatically make a record from which corresponding depths and times may be ascertained.

2. In combination with a well surveying instrument having means for simultaneously producing records indicating the inclinations of a bore hole at various depths and the times at which such records are made, means at the surface arranged to automatically make a record from which corresponding depths and times may be ascertained.

3. In combination with a well surveying instrument having means for simultaneously producing records indicating the inclinations of a bore hole at various depths and the times at which such records are made, supporting means by which the surveying instrument is lowered into a hole, and means controlled by the supporting means to automatically make a record from which corresponding depths and times may be ascertained.

4. In combination with a well surveying instrument having means for simultaneously producing records indicating the inclinations of a bore hole at various depths and the times at which such records are made, supporting means by which the surveying instrument is lowered into a hole, and means at the surface controlled by the supporting means to automatically make a record from which corresponding depths and times may be ascertained.

In testimony of which invention, I have hereunto set my hand, at Philadelphia, Pennsylvania, on this 22nd day of August, 1930.

GOTTDANK L. KOTHNY.